United States Patent
Chujoh et al.

(10) Patent No.: US 7,224,842 B2
(45) Date of Patent: *May 29, 2007

(54) OBJECT RECOGNITION APPARATUS AND OBJECT RECOGNITION METHOD

(75) Inventors: Takeshi Chujoh, Tokyo (JP); Hisashi Kazama, Yokohama (JP); Masayuki Maruyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 11/142,317

(22) Filed: Jun. 2, 2005

(65) Prior Publication Data

US 2005/0207620 A1  Sep. 22, 2005

Related U.S. Application Data

(62) Division of application No. 10/183,403, filed on Jun. 28, 2002, now Pat. No. 6,941,020.

(30) Foreign Application Priority Data

Jun. 29, 2001 (JP) ............................. 2001-200164

(51) Int. Cl.
*G06K 9/36* (2006.01)

(52) U.S. Cl. ...................... 382/233; 382/236; 382/104; 348/143

(58) Field of Classification Search ........ 382/103–104, 382/233, 236, 245–253; 348/143, 149, 148, 348/154, 156–160
See application file for complete search history.

(56) References Cited

U.S. PATENT DOCUMENTS

| 5,995,663 | A | * | 11/1999 | Itsuzaki et al. ............. 382/203 |
| 6,160,900 | A | * | 12/2000 | Miyawaki et al. .......... 382/107 |
| 6,724,421 | B1 | | 4/2004 | Glatt |
| 6,744,908 | B2 | | 6/2004 | Chujoh et al. |
| 6,876,701 | B1 | | 4/2005 | Chujoh et al. |
| 2003/0219073 | A1 | * | 11/2003 | Lee et al. ............. 375/240.27 |
| 2004/0240744 | A1 | | 12/2004 | Honda et al. |

FOREIGN PATENT DOCUMENTS

| JP | 2-71380 | 3/1990 |
| JP | 7-177349 | 7/1995 |
| JP | 9-252467 | 9/1997 |
| JP | 2000-197064 | 7/2000 |
| JP | 2000-217129 | 8/2000 |
| JP | 2000-242795 | 9/2000 |

OTHER PUBLICATIONS

A. Okazaki, et al., pp. 102-103, "Beginners Guide to Image Processing Technique," 2000.

* cited by examiner

*Primary Examiner*—Matthew C. Bella
*Assistant Examiner*—Ali Bayat
(74) *Attorney, Agent, or Firm*—Oblon, Spivak, McClelland, Maier & Neustadt, P.C.

(57) ABSTRACT

An object recognition apparatus comprises a moving picture decoding section which decodes data obtained by encoding a moving picture. A background image producing section produces a background image based on encoding information and a reproduction image. An object recognizing section sets a predetermined region to detect a feature quantity of an object, and carries out matching between the reproduction image and the background image, thereby recognizing the object in the moving picture.

18 Claims, 7 Drawing Sheets

OBJECT RECOGNITION APPARATUS AND OBJECT RECOGNITION METHOD

CROSS-REFERENCE TO RELATED APPLICATIONS

This application is a division of and claims the benefit of priority under 35 USC §120 from U.S. application Ser. No. 10/183,403, filed Jun. 28, 2002 now U.S. Pat. No. 6,941,020 and is based upon and claims the benefit of priority under 35 USC §119 from Japanese Patent Application No. 2001-200164, filed Jun. 29, 2001, the entire contents of which are incorporated herein by reference.

BACKGROUND OF THE INVENTION

1. Field of the Invention

The present invention relates to an object recognition apparatus and an object recognition method. More particularly, the present invention relates to an apparatus and method for recognizing an object or objects that have invaded into a moving picture from an output of a moving picture encoding device or a moving picture decoding device.

2. Description of the Related Art

In general, it is necessary to investigate a pixel value in order to detect a specific object in a moving picture and recognize the object. For example, in Akio Okazaki, "Beginners Guide to Image Processing Technique", Kogyo Chosakai, pp. 102–103, 2000, there has been introduced a process for isolating a moving object based on a background differential. In this technique, a differential value in pixel vales between a reference background image and an input image is binarized by a threshold, thereby achieving isolation of the moving object. However, there is a problem that such a process concerning a pixel value requires a large amount of computation. For example, in the case of a CIF format which is frequently used in ITU-T H. 261, H 263, ISO/IEC MPEG-4 or the like that is a standard scheme for encoding a moving picture, processing has been necessary for a total of 101376 pixels that are horizontal 352 pixels and vertical 288 pixels. For such a process with a large amount of computation, it has been necessary to provide dedicated hardware. Thus, there has been a large problem on an aspect of cost efficiency.

As a technique for detecting a moving object in a moving picture, in Jpn. Pat. Appln. KOKAI Publication No. 9-252467, "Moving Object Detecting Apparatus", there has been proposed a method using a motion vector produced by a moving picture encoding device. According to this method, the motion vector for each macro-block produced by the moving picture encoding device is employed. Thus, there is no need to particularly investigate the motion of a pixel in order to detect a moving object, and an amount of computation can be significantly reduced.

However, the following problem has occurred with a conventional technique for detecting a moving object using encoded data. That is, a macro-block whose motion vector is large or a rewritten macro-block is not always limited to a moving object. In addition, even in a macro-block in the moving object, a block which has not been rewritten exists. Thus, when this technique is used for monitoring, a necessary video image has not always been acquired successfully.

Further, in detection for each macro-block, when a target object is included partly in the macro-block, there has been a problem that such inclusion is missed because an error is too small for each macro-block. Specifically, in a case shown in FIG. 8, since only a small error occurs at parts of the head, left leg, and left arm of an invader 500 for each macro-block, it has been difficult to determine these parts as a portion of an invading object.

As has been described above, there has been a problem that a large amount of computation is required to detect a specific object and recognize what the object is. On the other hand, in the conventional technique using encoded data, there has been a problem that the recognition precision is not sufficient.

BRIEF SUMMARY OF THE INVENTION

It is an object of the present invention to provide an object recognition apparatus and an object recognition method with a small amount of computation and high recognition precision.

In order to achieve the above described object, according to a first aspect of the present invention, there is provided an object recognition apparatus comprising:

a moving picture decoding section which decodes data obtained by encoding a moving picture;

a background image producing section which produces a background image based on encoding information from the moving picture decoding section and a reproduction image produced at the moving picture decoding section; and an object recognizing section which sets a predetermined region to detect a feature quantity of an object and carries out matching between the reproduction image and the background image, thereby recognizing the object in the moving picture.

According to a second aspect of the present invention, there is provided an object recognition method comprising:

decoding data obtained by encoding a moving picture;

producing a background image based on encoding information in the moving picture decoding and a reproduction image produced in the moving picture decoding; and setting a predetermined region to detect a feature quantity of an object, and carrying out matching between the reproduction image and the background image, thereby recognizing the object in the moving picture.

According to a third aspect of the present invention, there is provided an object recognition apparatus comprising:

a moving picture encoding section which encodes a moving picture;

a background image producing section which produces a background image based on encoding information from the moving picture encoding section and a local reproduction image produced at the moving picture encoding section; and an object recognizing section which sets a predetermined region to detect a feature quantity of an object, and carries out matching between the local reproduction image and the background image, thereby recognizing the object in the moving picture.

According to a fourth aspect of the present invention, there is provided an object recognition apparatus comprising:

a moving picture encoding section which encodes an input moving picture;

a background image producing section which produces a background image based on encoding information from the moving picture encoding section and the input moving picture; and an object recognizing section which sets a predetermined region to detect a feature quantity of an object, and carries out matching between the input moving picture and the background image, thereby recognizing an object in the moving picture.

DETAILED DESCRIPTION OF THE INVENTION (First Embodiment)

Figure 1:
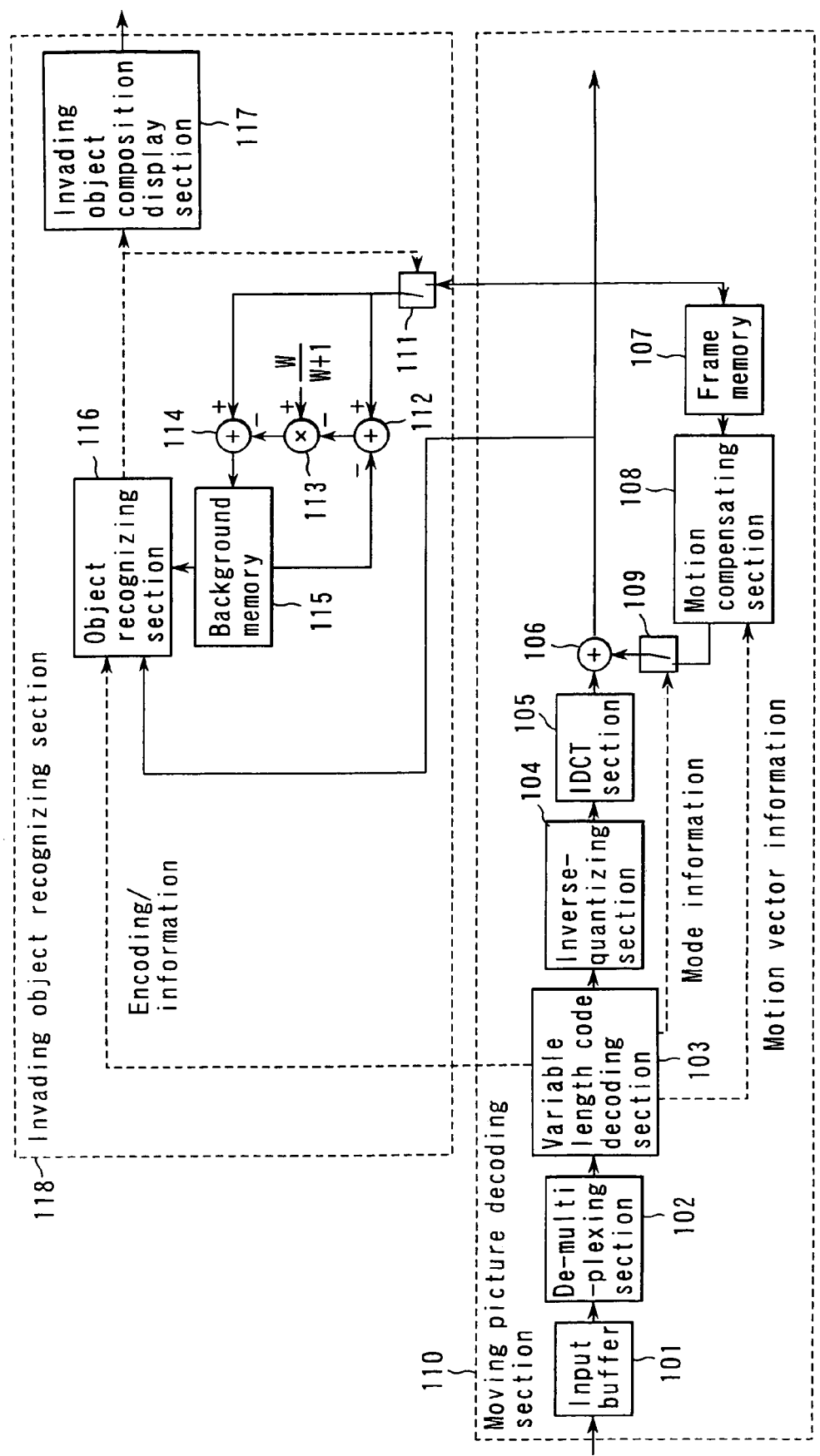
FIG. 1 is a block diagram showing a configuration of an apparatus for recognizing an object invading into a moving picture according to a first embodiment of the present invention.

Hereinafter, a first embodiment of the present invention will be described with reference to the accompanying drawings. FIG. 1 is a block diagram showing a configuration of an apparatus for recognizing an object invading into a moving picture according to one embodiment of the present invention. The apparatus for recognizing an object invading into a moving picture shown in FIG. 1 comprises two sections, i.e., a moving picture decoding section 110 and an invading object recognizing section 118.

At the moving picture decoding section 110, first, encoded data received from a transmission channel or a storage system is temporarily stored in an input buffer 101. Then, the temporarily stored data is separated based on a syntax for each frame by a de-multiplexing section 102, and is outputted to a variable length code decoding section 103.

The variable length code decoding section 103 decodes a variable length code of information on each syntax. If a macro-block mode is INTRA at the variable length code decoding section 103, a mode selecting switch 109 is selected to be OFF. In this case, quantization DCT coefficient information decoded by the variable length code decoding section 103 is inverse-quantized by an inverse-quantizing section 104, and inverse discrete cosine transform processing is applied by an IDCT section 105, thereby generating a reproduction image signal. This reproduction image signal is stored in a frame memory 107 as a reference image while the signal is inputted to an invading object composition display section 117 in the invading object recognizing section 118.

When the macro-block mode is INTER and NOT_CODED at the variable length code decoding section 103, the mode selecting switch 109 is selected to be OFF. In this case, quantization DCT coefficient information decoded by the variable length code decoding section 103 is inverse-quantized by the inverse-quantizing section 104. Then, inverse discrete cosine transform processing is carried out by the IDCT section 105, and the information is decoded by the variable length code decoding section 103.

A motion compensating section 108 motion-compensates for a reference image based on motion vector information decoded by the variable length code decoding section 103, adds them by an adder 106, and generates a reproduction image signal. This reproduction image signal is stored in the frame memory 107 as a reference image while it is inputted to the invading object composition display section 117 in the invading object recognizing section 118.

On the other hand, at the invading object recognizing section 118, an object recognizing section 116 determines whether or not the macro-block is an invading object from encoding information and a reproduction image signal from the variable length code decoding section 103 and an image signal of a background memory 115, and sends the recognition result to the invading object composition display section 117 and a background memory update switch 111.

When the recognition result of the macro-block is an invading object, the background memory update switch 111 is turned OFF. Otherwise, the switch is turned ON. When this background memory update switch 111 is turned ON, an image signal at the same location as the macro-block of the current background memory 115 is subtracted from a decode image signal of the macro-block in an adder 112. A value obtained by multiplying the resulting value by W(W+1) is subtracted from the decode image signal of the macro-block in an adder 114 (where W is a parameter for background updating and is a real number of 0 or more). Then, the resulting value is written as a new background into the background memory 115, whereby the value of the background memory 115 is updated. In this manner, a background image is produced.

The invading object composition display section 117 displays the location of the invading object to be composed with a reproduction image from the recognition result and reproduction image signal sent from the object recognizing section 116.

Figure 2:
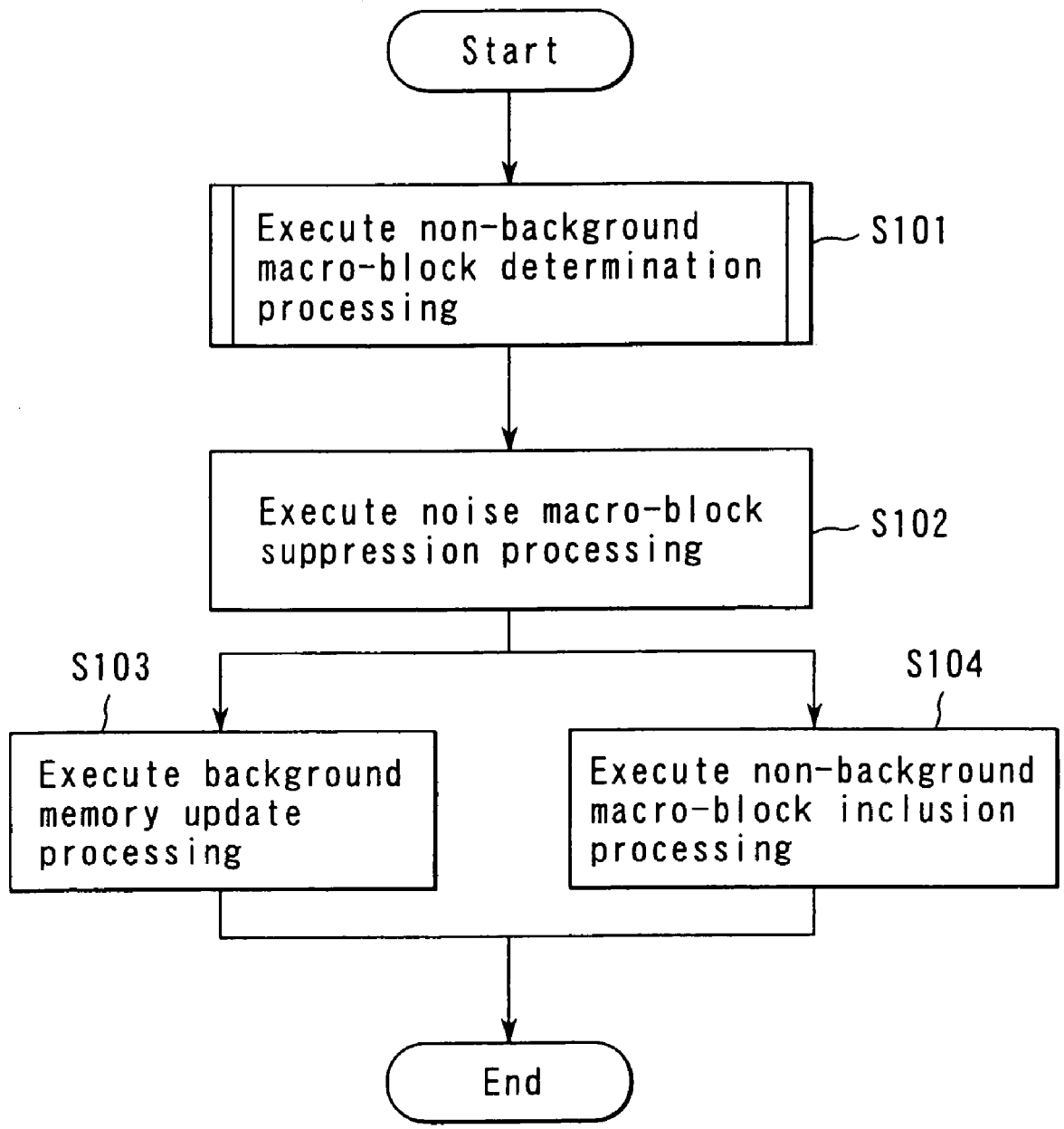
FIG. 2 is a flow chart showing an operation of an invading object recognizing section of FIG. 1.

FIG. 2 is a flow chart showing an operation of the invading object recognizing section 118 for each frame. First, in a non-background macro-block determination processing (step S101), it is determined whether or not the macro-block is a non-background from the encoding information and reproduction image signal and the image signal of the background memory 115 for each macro-block.

Next, in a noise macro-block suppression (step S102), when all the adjacent 8 macro-blocks of the macro-blocks which has been determined as non-background macro-blocks are background macro-blocks, they are determined as noise, and they are eliminated from the non-background macro-blocks.

In a background memory update processing (step S103), as explained in FIG. 1, the background memory 115 in a macro-block portion which has been determined as a background macro-block is updated in accordance with a reproduction image signal. Here, $F_C(m, n)$ denotes an pixel value of a luminescence signal of a reproduction image signal of the macro-block; and B(m, n) denotes a pixel value of a background memory. Here, "m" and "n" denote addresses in vertical and horizontal directions of the pixel values in a macro-block, where m=0 to 15 and n=0 to 15.

In the present embodiment, as shown in the following formula (1), luminescence values $F_C(m, n)$ of a reproduction image signal of the macro-block are weighted by the parameter W (real of 0 or more) for background updating and averaged, and the resultant value is added in a background memory B(m, n).

$$B(m, n) = \frac{1}{W+1} F_C(m, n) + \frac{W}{W+1} F(m, n) \quad (1)$$

$$= F_C(m, n) - \frac{W}{W+1} (F_C(m, n) - B(m, n))$$

When an image is not written in the background memory yet, the reproduction image signal $F_C((m, n)$ of the macro-block is written into the background memory B(m, n).

A block configuration for updating the background memory 115 of FIG. 1 corresponds to a case in which a formula for weighting and averaging is modified into the right side of the formula (1).

Figure 5:
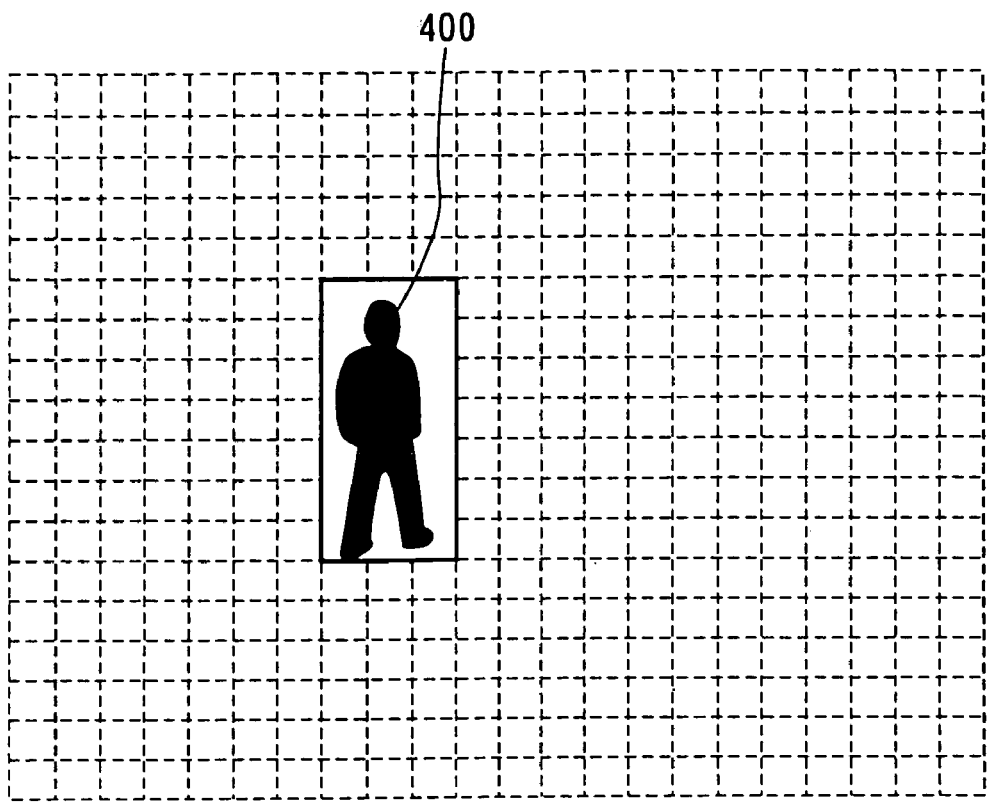
FIG. 5 is a view when a detection result is displayed.
Figure 8:
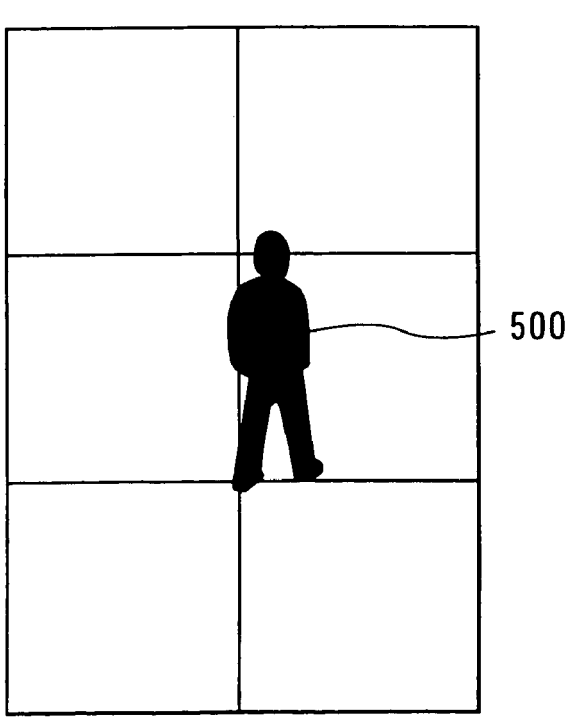
FIG. 8 is a view when a detection result is displayed.

Lastly, in a non-background macro-block inclusion processing (step S104), a rectangular object is detected such that a macro-block which has been determined as a non-background macro-block is included, and it is determined whether or not the macro-block is included according to restriction in size of an invading object to be detected. The included rectangle is composed with a reproduction image signal 400 to be displayed as a detection result, as shown in FIG. 5.

Figure 3:
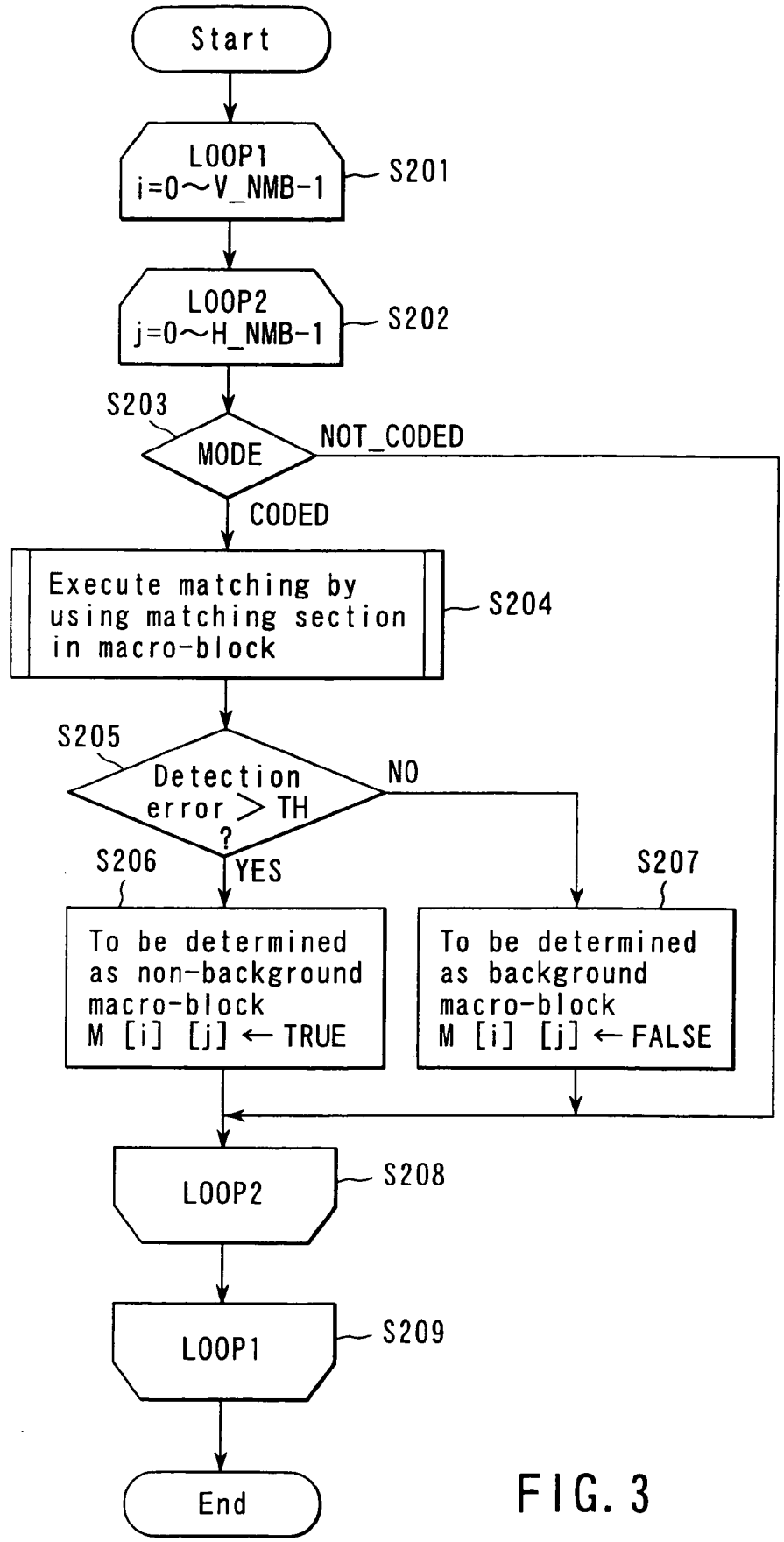
FIG. 3 is a flow chart showing a specific operation of a non-background macro-block determination result of FIG. 2.

FIG. 3 is a specific flow chart showing the non-background macro-block determination processing (step S101). Here, "i" and "j" denote addresses of macro-blocks in vertical and horizontal directions in a frame, respectively. A two-dimensional matrix M[i] [j] is a matrix that stores information indicating whether or not each macro-block is a background macro-block where TRUE indicates a non-background object macro-block and FALSE indicates a background macro-block. An initial value of the matrix M is FALSE.

A determination is made about mode information MODE from the variable length code decoding section 103 for each macro-block (step S203). When the MODE is CODED, a detection error is obtained at a matching section in the macro-block based on the reproduction image signal of the macro-block and the image signal of the background memory 115 (step S204).

Then, this detection error is compared with a threshold TH (step S205). When the error is greater than the threshold TH, it is determined that the macro-block is a non-background macro-block, and TRUE is substituted for M[i] [j] (step S206). When the error is equal to or smaller than the threshold TH, the macro-block is judged to be a background block, and FALSE is substituted for M[i] [j] (step S207). When the MODE is NOT_CODED, nothing is done, and the processing goes to the next macro-block processing.

Figure 4:
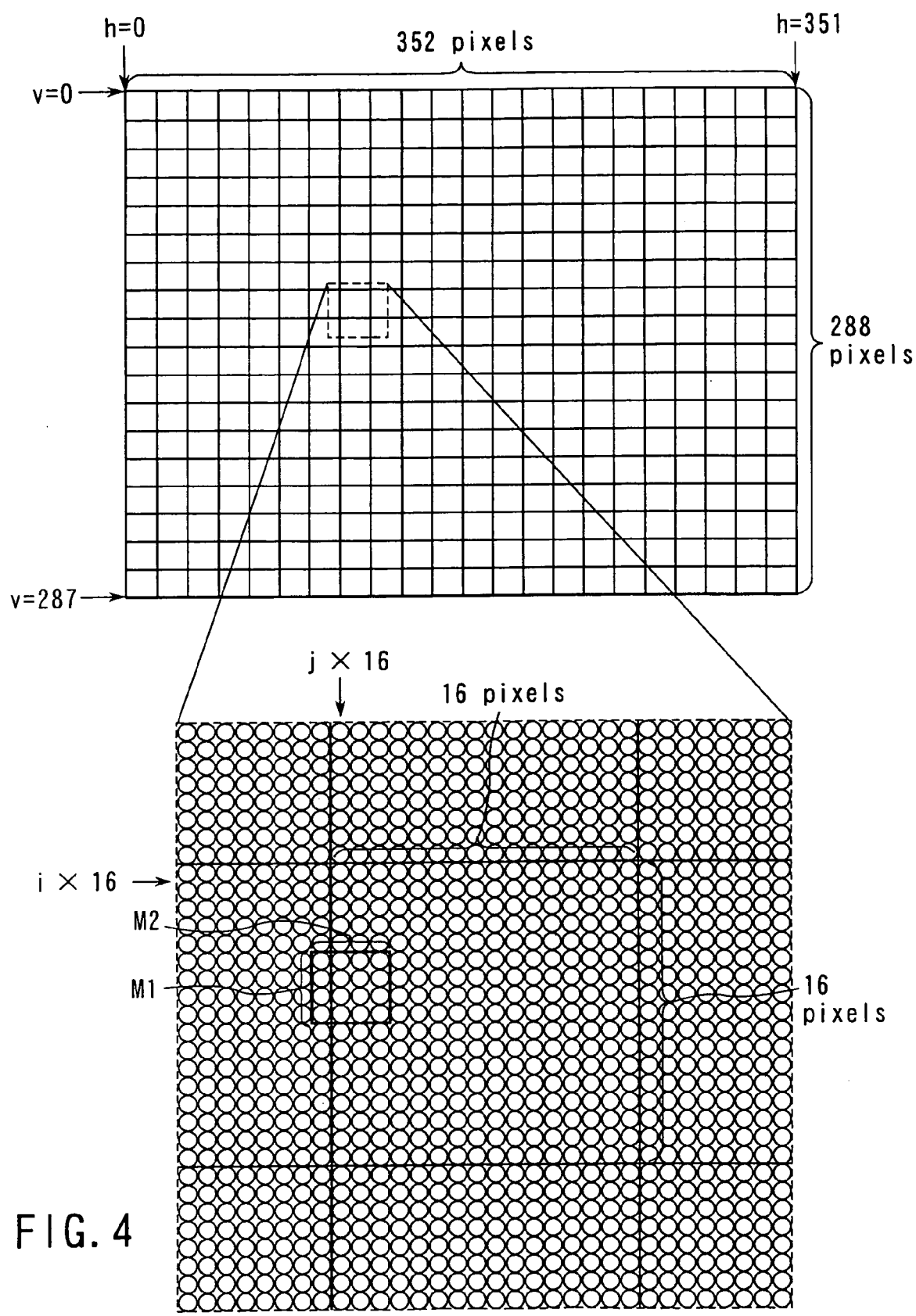
FIG. 4 is a flow chart showing an operation of a moving object feature extracting section according to the present invention.

FIG. 4 is a view for explaining an operation of a matching section in a macro-block in the step S204. This example shows a format of a CIF luminescence signal, which is composed of vertical 288 pixels and horizontal 352 pixels. Each macro-block is defined as vertical 16 pixels and horizontal 16 pixels. Here, in the macro-block, a-small block of vertical $M_1$ pixels and horizontal $M_2$ pixels is set, and a detection error between a small block of a reproduction image signal and a small block of a background memory is obtained. At this time, the small block may be set so as to be overlapped with the surrounding macro-block.

In the present embodiment, when the value of the detection error is the greatest in a search range, it is assumed as a result of the detection error of the matching section in the macro-block. At this time, the search range is defined as a vertical range of "i"×16−$M_1$/2 to (i+1)×16−$M_1$/2−1 and a horizontal range of "j"×16−$M_2$/2 to (j+1)×16−$M_2$/2−1 when a pixel at the upper left corner of a small block is defined as a start point.

In the present embodiment, as computation of the detection error, there is employed an average of ratios of an absolute value in difference between the reproduction image signal shown in the following formula (2) and the image signal of the background memory to the image signal of the background memory.

$$T = \frac{1}{M_1 \times M_2} \sum_{m=0}^{M_1-1} \sum_{n=0}^{M_2-1} \left| \frac{B(m, n) - F_C(m, n)}{B(m, n)} \right| \quad (2)$$

Where, $F_C(m, n)$ denotes a pixel value of a luminescence signal of a reproduction image signal, and B(m, n) denotes a pixel value of a background memory. Here, "m" and "n" denote addresses in vertical and horizontal directions of pixel values in a small block, where m=0 to $M_1$−1, n=0 to $M_2$−1.

In this way, a small block is set in a macro-block, and an error is detected, whereby, even if an invading object exists partly in the macro-block, such an error can be detected.

In the present embodiment, although a description has been given, assuming that the shape of a small block is rectangular, the small block in another shape may be used. In addition, in the present embodiment, although a description has been given, assuming that the ratios of the absolute value of a difference between the reproduction image signal shown in the formula (2) and the image signal of the background memory to the image signal of the background memory are averaged, for example, another evaluation scale such as specific color, texture, shape or the like may be used.

In the present embodiment, the reproduction image signal can be partially processed without being entirely processed, by efficiently using encoding information for a moving picture decoder. Thus, image recognition processing can be carried out with a small amount of computation. In addition, a small block is set in a macro-block, and an error is detected by matching, whereby an invading object recognition result can be obtained with high precision.

(Second Embodiment)

Figure 6:
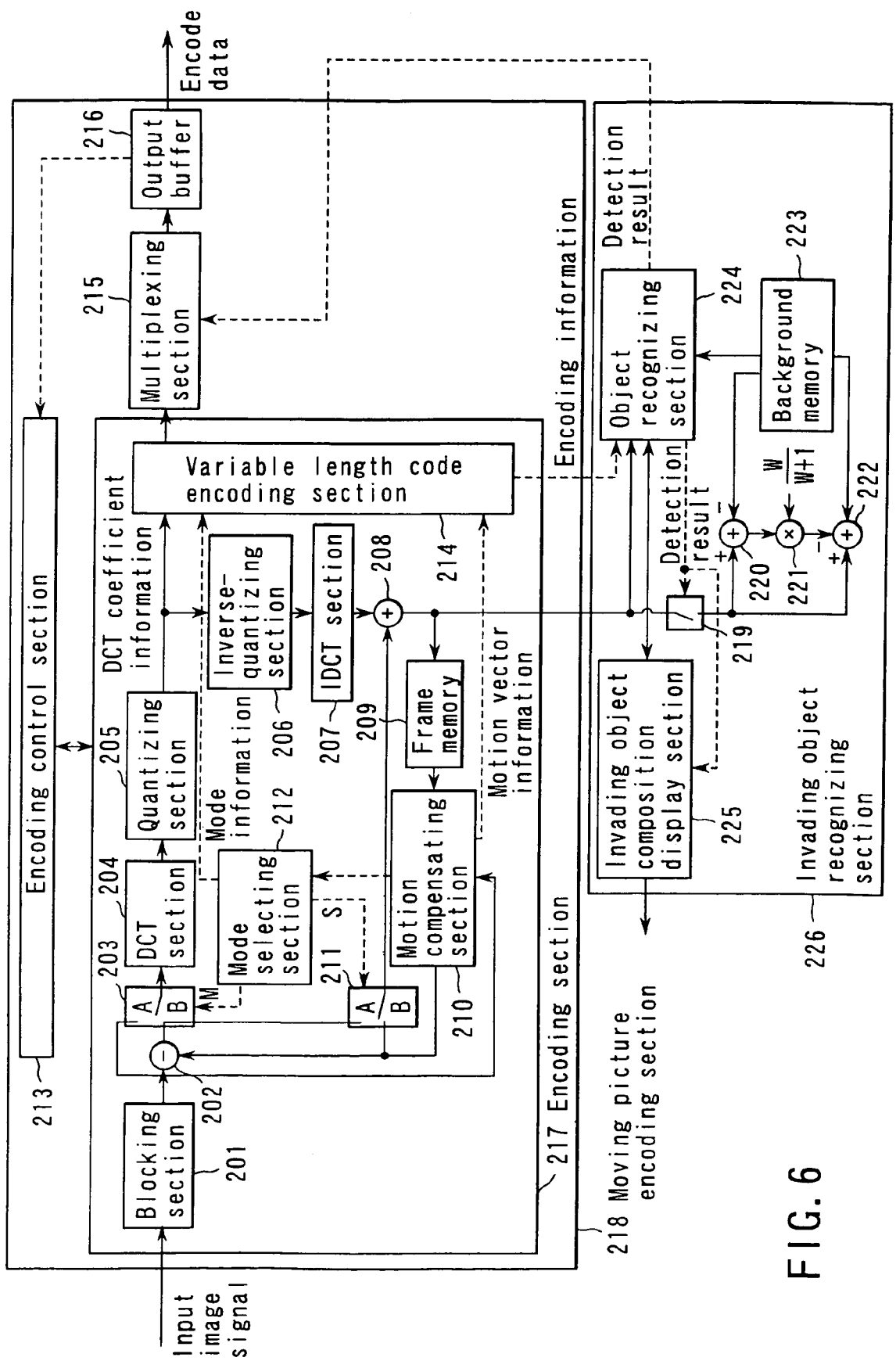
FIG. 6 is a block diagram showing a configuration of an encoding section of a device for detecting an object invading into a moving picture according to a second embodiment of the present invention.
Figure 7:
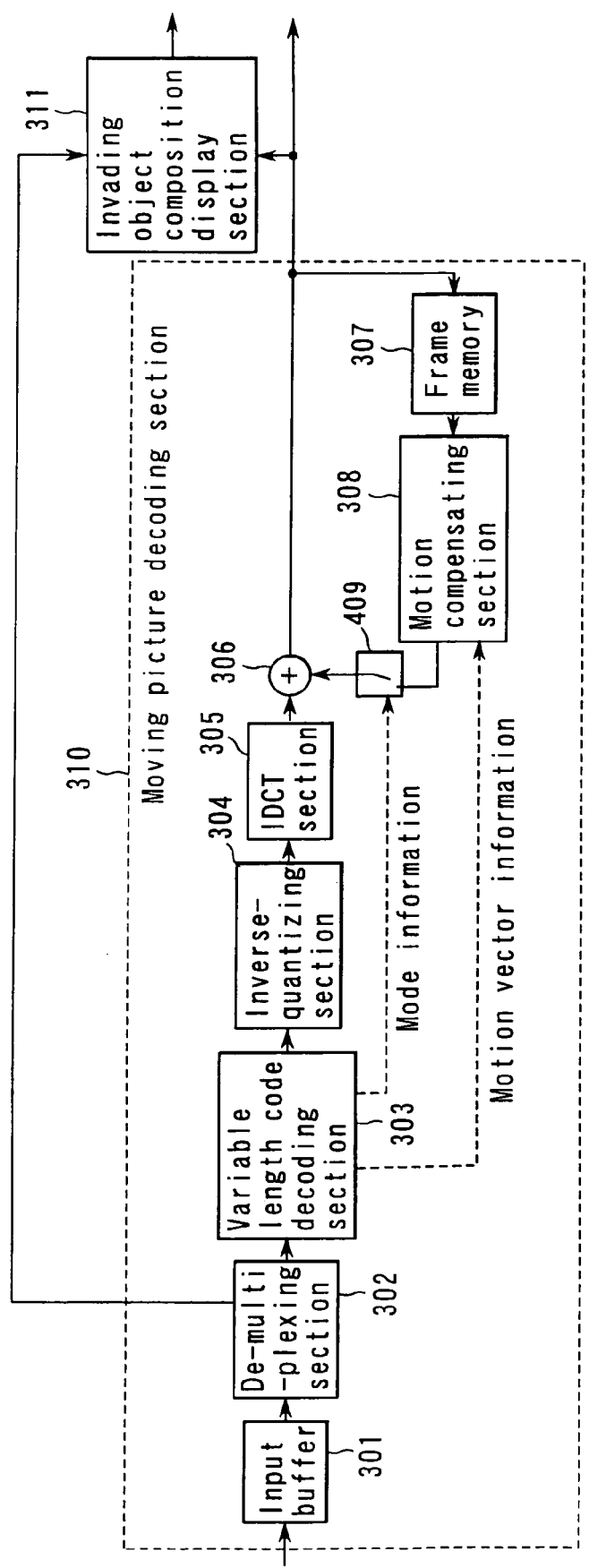
FIG. 7 is a block diagram showing a configuration of a decoding section of the device for detecting an object invading into a moving picture according to the second embodiment of the present invention.

FIG. 6 and FIG. 7 are block diagrams each showing a configuration of an apparatus for recognizing an object invading into a moving picture according to a second embodiment of the present invention. In the present embodiment, an invading object recognizing section is combined with a moving picture encoding section.

In FIG. 6, an input moving picture signal is divided into macro-blocks by a blocking section 201. The input moving picture signal divided into macro-blocks is inputted to a subtracter 202, a difference from a predicted image signal is obtained, and a predicted residual difference signal is generated. One of the predicted residual difference signal and the input moving picture signal from the blocking section 201 is selected by a mode selecting switch 203. Then, the selected signal is subjected to a discrete cosine transform by a DCT (discrete cosine transforming) section 204. The DCT coefficient data obtained by the DCT section 204 is quantized by a quantizing section 205. The signal quantized by the quantizing section 205 is branched into two components, and one component of the branched signal is encoded to be a variable length by a variable length code encoding section 214. The other component of the quantized and branched signals is sequentially subjected to processing of the quantizing section 205 and DCT section 204 and inverse processing by means of an inverse-quantizing section 206 and an IDCT (inverse discrete cosine transforming) section 207. Then, a local decode signal is generated by being added to a predicted image signal to be inputted via a switch 211 by an adder 208. This local decode signal is stored in a frame memory 209, and is inputted to a motion compensating section 210. The motion compensating section 210 generates a predicted image signal, and sends information required for the mode selecting switch 203.

A mode selecting section 212 selects a macro-block which carries out inter-frame encoding and a macro-block which carries out intra-frame encoding for each macro-block, based on predicted information P from the motion compensating section 210. When intra-frame encoding (intra-encoding) is carried out, mode selecting switch information M is defined as A, and switch information S is defined as A. When inter-frame encoding (inter-encoding) is carried out, mode selecting switch information M is defined as B, and switch information S is defined as B.

In the mode selecting switch 203, switching is performed based on the mode selecting switch information P. Also, in the switch 211, switching is performed based on the switch information S. As the mode, there are an intra mode (INTRA), an inter mode (INTER), and an non-encode mode (NOT_CODED). Each of the modes is associated for each macro-block, the INTRA macro-block is an image region to be inter-frame encoded, the INTER macro-block is an image region to be intra-frame encoded, and the NOT_CODED macro-block is an encoding free image region.

On the other hand, in an invading object recognizing section 226, an object recognizing section 224 determines whether the macro-block is an invading object from the encoding information and the local reproduction image signal from the variable length code encoding section 214 and the image signal of the background memory. Then, the recognition result is sent to an invading object composition display section 225 and a background memory update switch 219. When the recognition result of the macro-block is an invading object, the background memory update switch 219 is turned OFF. Otherwise, the switch is turned ON. When the background memory update switch 219 is turned ON, the background memory 223 subtracts an image signal at the same location as the macro-block of the current background memory 223 from the decode image signal of the macro-block by means of an adder 220. Then, a value obtained by multiplying W/(W+1) for the subtracted value (W is a parameter for background updating and is a real of 0 or more) by means of a multiplier 221 is subtracted in an adder 222 from the decode image signal of the macro-block. Then, the resultant value is written as a new background into a background memory 223, whereby the value of the background memory 223 is updated. In this manner, a background image is produced.

The invading object composition display section 225 composes the location of an invading object in a reproduction image from the recognition result and the reproduction image signal sent from an object recognizing section 224 for displaying.

The contents of processing by the object recognizing section 224, the invading object composition display section 225 and the like are identical to those of processing shown in FIG. 2 to FIG. 5 and the formulas (1) and (2) in the above described first embodiment.

An encoding control section 213 controls the encoding section 217 based on encoding information of the moving picture encoding section 218 and a buffer quantity of the output buffer 216. The encoded data encoded by the variable length code encoding section 214 is multiplexed by the multiplexing section 215 based on the recognition result from the object recognizing section 224. Then, a transmission rate is smoothened by the output buffer 216. The smoothened transmission rate is sent as encoded data to a transmission system or storage system.

Although the local reproduction signal and the image signal of the background memory are used in the invading object recognizing section 226 of FIG. 6, a method using the input moving picture signal and the image signal of the background memory is also available. In the case of this method, an input moving picture memory for one frame is required. However, there is an advantage that the signals are not affected by video image degradation due to encoding because a local reproduction image signal is not used.

FIG. 7 is a block diagram showing a decoding section in response to the encoding section of FIG. 6.

First, a moving picture decoding section 310 temporarily stores encoded data received from a transmission channel or storage system in an input buffer 301. Then, a de-multiplexing section 302 de-multiplexes the encoded data temporarily stored for each frame based on a syntax, and outputs the data to a variable length code decoding section 303. The variable length code decoding section 303 decodes a variable length code of information of each syntax.

If a macro-block mode is INTRA at the variable length code decoding section 303, a mode selecting switch 409 is selected to be OFF. Then, quantization DCT coefficient information decoded by the variable length code decoding section 303 is inverse-quantized by an inverse-quantizing section 304. Then, inverse discrete cosine transform processing is carried out by an IDCT section 305, thereby generating a reproduction image signal. This reproduction image signal is stored in a frame memory 307 as a reference image while it is inputted to an invading object composition display section 311.

If the micro-block mode is INTER or NOT_CODED at the variable length code decoding section 303, a mode selecting switch 309 is selected to be OFF. Then, the quantization DCT coefficient information decoded by the variable length code decoding section 303 is inverse-quantized by the inverse-quantizing section 304. Then, inverse discrete cosine transform processing is carried out by the IDCT section 305. Based on motion vector information decoded by the variable length code decoding section 303, a motion compensating section 308 motion-compensates for a reference image, adds them by an adder 306, and generates a reproduction image signal. This reproduction image signal is stored in the frame memory 307 as a reference image while it is inputted to the invading object composition display section 311. On the other hand, the invading object determination result de-multiplexed by the de-multiplexing section 302 is inputted to the invading object composition display section 311.

In the present embodiment, recognition processing of the invading object which has been carried out by the moving picture decoder in the first embodiment is carried out in combination with a moving picture encoder, thereby multiplexing the recognition result. However, there may be used a method of encoding as another object a rectangular image per se that includes a macro-block which has been determined as inclusive of an invading object by ISO/IEC MPEG-4 multi-object encoding, and then, multiplexing the object to be sent to a moving picture decoding device.

As has been described above, in the present embodiment, although there has been shown an example when processing is carried out in units of all the macro-blocks, of course, there can be used a similar method even in processing in units smaller or greater than the above units. In addition, although a description has been given by way of example of a scheme using the DCT as the moving picture encoding method, a similar method can be used for another transform technique, for example, Wavelet transform or the like.

In the present embodiment, the reproduction image signal can be partially processed without being entirely processed, by efficiently using encoding information contained in the moving picture encoding section. Thus, image recognition processing can be carried out with a small amount of computation. In addition, a small block is set in a macro-block, and an error is detected by matching, whereby an invading object recognition result can be obtained with high precision.

It should be noted that the object recognition apparatus according to the present invention can recognize an object or a plurality of objects in a moving picture.

According to the above described first and second embodiments, a portion to be processed in units of pixels can be narrowed by using a moving picture encoding/decoding technique, thus making it possible to carry out processing with a small amount of computation. In addition, a small region for detecting a feature quantity of an invading object is set, and matching between an input image and a background image is carried out, thereby making it possible to achieve object recognition with high recognition precision.

As has been described above, according to the present invention, there can be provided an object recognition apparatus and an recognition method capable of recognizing a specific object with a high speed, high stability, and high precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object recognition method comprising:
   decoding data obtained by encoding a moving picture;
   producing a background image based on encoding information derived during decoding and producing a reproduction image based on data decoded in said decoding; and
   setting a predetermined region to detect a feature quantity of an object and carrying out matching between said reproduction image and said background image, thereby recognizing the object in the moving picture.

2. An object recognition method according to claim 1, wherein the setting step comprises performing a non-background determination process wherein whether mode information from the moving picture decoding section represents encoding or not is determined for each macro-block, and when the mode information represents encoding, a small block of vertical $M_1$ pixels and horizontal $M_2$ pixels is set in a macro-block, and whether the macro-block is a non-background or not is determined, based on a detection error between the small block of the reproduction image and the small block of the background image.

3. An object recognition method according to claim 2, wherein the setting step comprises performing a non-background determination process wherein whether mode information from the moving picture decoding section represents encoding or not is determined for each macro-block, and when the mode information represents not encoding, the processing goes to a next macro-block processing.

4. An object recognition method according to claim 2, wherein the setting step comprises performing a noise suppression process wherein when all the adjacent 8 macro-blocks of a macro-block which has been determined as non-background are background macro-blocks, they are determined as noise, and eliminated from non-background macro-blocks.

5. An object recognition method according to claim 4, further comprising:
   storing the background image, said setting step comprising performing a process of updating the background memory wherein a portion of the background memory which has been determined as a background macro-block is updated in accordance with the reproduction image.

6. An object recognition method according to claim 4, wherein the setting step comprises performing a non-background inclusion process wherein a rectangular object is detected such that a macro-block which has been determined as a non-background is included, and it is determined whether or not the macro-block is included according to restriction in size of the object.

7. An object recognition method comprising:
   encoding a moving picture;
   producing a background image based on information derived during encoding and a local reproduction image based on information encoded in the encoding; and
   setting a predetermined region to detect a feature quantity of an object, and carrying out matching between said local reproduction image and said background image, thereby recognizing the object in the moving picture.

8. An object recognition method according to claim 7, wherein the setting step comprises performing a non-background determination process wherein whether mode information from the moving picture encoding section represents encoding or not is determined for each macro-block, and when the mode information represents encoding, a small block of vertical $M_1$ pixels and horizontal $M_2$ pixels is set in a macro-block, and whether the macro-block is a non-background or not is determined, based on a detection error between the small block of the local reproduction image and the small block of the background image.

9. An object recognition method according to claim 7, wherein the setting step comprises performing a non-background determination process wherein whether mode information from the moving picture encoding section represents encoding or not is determined for each macro-block, and when the mode information represents not encoding, the processing goes to a next macro-block processing.

10. An object recognition method according to claim 9, wherein the setting step comprises performing a noise suppression process wherein when all the adjacent 8 macro-blocks of a macro-block which has been determined as non-background are background macro-blocks, they are determined as noise, and eliminated from non-background macro-blocks.

11. An object recognition method according to claim 10, further comprising:

storing the background image, wherein the setting step comprises performing a process of updating the background memory wherein a portion of the background memory which has been determined as a background macro-block is updated in accordance with the local reproduction image.

12. An object recognition method according to claim 10, wherein the setting step comprises performing a non-background inclusion process wherein a rectangular object is detected such that a macro-block which has been determined as a non-background is included, and it is determined whether or not the macro-block is included according to restriction in size of the object.

13. An object recognition method comprising:

encoding an input moving picture;

producing a background image based on information derived during encoding and producing a moving picture image based on said input moving picture; and setting a predetermined region to detect a feature quantity of an object, and carrying out matching between said input moving picture image and said background image, thereby recognizing the object in the moving picture.

14. An object recognition method according to claim 13, wherein the setting step comprises performing a non-background determination process wherein whether mode information from the moving picture encoding section represents encoding or not is determined for each macro-block, and when the mode information represents encoding, a small block of vertical $M_1$ pixels and horizontal $M_2$ pixels is set in a macro-block, and whether the macro-block is a non-background or not is determined, based on a detection error between the small block of the input moving picture and the small block of the background image.

15. An object recognition method according to claim 14, wherein the setting step comprises performing a noise suppression process wherein when all the adjacent 8 macro-blocks of a macro-block which has been determined as non-background are background macro-blocks, they are determined as noise, and eliminated from non-background macro-blocks.

16. An object recognition method according to claim 15, further comprising:

storing the background image, wherein the setting step comprises performing a process of updating the background memory wherein a portion of the background memory which has been determined as a background macro-block is updated in accordance with the input moving picture.

17. An object recognition method according to claim 15, wherein the setting step comprises performing a non-background inclusion process wherein a rectangular object is detected such that a macro-block which has been determined as a non-background is included, and it is determined whether or not the macro-block is included according to restriction in size of the object.

18. An object recognition method according to claim 13, wherein the setting step comprises performing a non-background determination process wherein whether mode information from the moving picture encoding section represents encoding or not is determined for each macro-block, and when the mode information represents not encoding, the processing goes to a next macro-block processing.

* * * * *